United States Patent [19]

Howell

[11] 4,325,841
[45] Apr. 20, 1982

[54] NON-FREE-AMINE PROMOTER SYSTEM FOR POLYESTER COMPOSITION

[75] Inventor: Hilda Howell, Pittsburgh, Pa.

[73] Assignee: Koppers Company, Inc., Pittsburgh, Pa.

[21] Appl. No.: 185,499

[22] Filed: Sep. 9, 1980

Related U.S. Application Data

[62] Division of Ser. No. 61,379, Jul. 27, 1979, Pat. No. 4,267,279.

[51] Int. Cl.$^3$ ............................................. B01J 31/12
[52] U.S. Cl. .................................. 252/431 C; 252/426
[58] Field of Search ............................ 252/426, 431 C

[56] References Cited

U.S. PATENT DOCUMENTS

| | | | |
|---|---|---|---|
| T942,003 | 3/1974 | Suggs | 260/864 |
| 2,646,416 | 7/1953 | Parker | 260/45.4 |
| 2,684,346 | 7/1954 | Nickerson | 252/426 |
| 3,398,213 | 8/1968 | Chetakian | 260/863 |

FOREIGN PATENT DOCUMENTS

| | | |
|---|---|---|
| 974214 | 11/1964 | United Kingdom . |
| 1281891 | 9/1968 | United Kingdom . |
| 535317 | 11/1974 | U.S.S.R. . |

OTHER PUBLICATIONS

Japanese Patent Application No. 49,004, Mitsubishi Electric Co., Apr. 1974.
Japanese Patent Application No. 88,203, Nippon Shokubai Kagaku, Jul. 1976.
Kozyneva, H. et al., *Zh. Prikl. Khim* (Leningrad) 1976 49 (4), 920–921.

*Primary Examiner*—John F. Niebling
*Attorney, Agent, or Firm*—Oscar B. Brumback; J. Timothy Keane

[57] ABSTRACT

Gel-time drift may be reduced in promoted polyester resin systems by incorporation of an amine salt in accordance with the disclosed compositions and methods. The amine salt is a salt-like reaction product of an amine and a carboxylic acid-containing moiety. For free-amine type promoted resin systems, an amine salt may be substituted for the amine promotor to provide a low-energy curable polyester resin system having the advantages of a promoted system as well as being stabilized against gel-time drift. Comparative data show suppression of gel-time drift of resin samples containing an amine salt to as low as 7 percent of gel-time drift of counterpart free-amine promoted resin system samples.

6 Claims, 3 Drawing Figures

GEL-TIME DRIFT FOR TREATED AND UNTREATED
SAMPLES OF POLYESTER RESIN SYSTEM
UNDER ACCELERATED SHELF LIFE CONDITIONS
( EXAMPLE I )

GEL-TIME DRIFT FOR TREATED AND UNTREATED
SAMPLES OF POLYESTER RESIN SYSTEM
UNDER ACCELERATED SHELF LIFE CONDITIONS ( EXAMPLE II )

AVERAGE GEL-TIME DRIFT FOR SIX LOTS OF TREATED AND UNTREATED SAMPLES OF POLYESTER RESIN SYSTEM STORED UNDER AMBIENT SHELF LIFE CONDITIONS
(EXAMPLE III)

NON-FREE-AMINE PROMOTER SYSTEM FOR POLYESTER COMPOSITION

This is a division of application Ser. No. 61,379, filed July 27, 1979 now U.S. Pat. No. 4,267,279.

BACKGROUND OF THE INVENTION

Polyester resin systems are useful in a multitude of molding and coating applications. Of particular interest herein are polyester resin systems having components and additives which allow curing at low energy levels, provide improved shelf life and reduce gel-time drift.

Important parameters that desirably should remain fairly constant for the useful life of a resin system during a storage period, or its "shelf life", are the gel and curing time of the resin system. Variations in the reaction time for gelling, and subsequent curing, of a polyester resin system may be characterized as "gel-time drift". These variations are typically measured as the difference between a gel-time after a period of storage and a gel-time just after formulation of the resin system. Usually, polyester systems in storage for long periods acquire longer gel or curing times. Some polyester systems, however, may after long storage periods exhibit curing times which are shorter than the initial curing time of a freshly manufactured batch. Typical commercially-available polyester systems often have gel-time drifts in the range of minus 50 percent to plus 200 to 300 percent. Such variations frequently cause intolerable problems during molding or coating application processes where predictability of gel-time is a necessity.

Gel-time drift of a polyester resin system presents a complex problem inasmuch as there may be several inter-related factors responsible, namely, physical parameters of resin formulation, chemical composition of the resin system, the presence of contaminants, and shipping, handling and storage conditions. The problem of gel-time drift is particularly acute for the more highly reactive resin systems which may contain chemical promoters for accelerating the rate of gelling or for lowering the temperature of reaction as may be required in a casting operation. It has been found that a promoted polyester system may not only exhibit large variations in gel-time drift, but gel-time drifts may vary widely between samples within a single batch of a polyester formulation due to different storage and handling conditions.

There have been several additives found for controlling or suppressing gel-time drift in polymerizable molding and coating compositions, most of the compositions being of the polyester type. Some of these additives are metallic salts such as the alkaline-earth metal salts disclosed for use with polyester resins in U.S. Pat. No. 3,367,905; or the additives comprise organo-metallic salts such as phthalimide-potassium salts for use as stabilizers disclosed for use with phthalate-polyol transesterification products in German Offenlegenschrift No. 2,556,317. Other compounds have been used to compensate for the presence of special components. For example, U.S. Pat. No. 4,088,710 discloses that gel-time may be reduced for an unsaturated polyester thermosetting resin, which contains a gel-time-lengthening vinyl-phosphonate flame retardant, by adding an effective amount of maleic anhydride to the polyester. In British Pat. No. 1,281,891, unsaturated polyester resin containing a cobalt salt promoter is disclosed as stabilized against gel-time drift by the addition of bis(2-hydroxyethyl)sulfide. Certain amine-containing compounds have been used as gel-time drift stabilizers. For example, improvements in stability and gel-time drift have been found for polyester resins incorporating a combination of two or more quinone-type inhibitors with an aryl ethanolamine, as disclosed in Werts, A. P., *Annual Conf. of Soc. Plast. Ind., Reinf. Plast./Compos. Div., Proc.*, 26th, 1971, 4-C, 1–10. A decrease in gel-time has been reported for a polyester resin system containing a cobalt-dipyridyl promoter combination [Goodman et al., *J. Paint Tech.*, 43, 59 (1971)]. It was noted in Kozyreva, H. G. et al, *Zh. Prikl, Khim, (Leiningrad)*, 1976, 49(4), 920-1, that the degree of cross-linking in unsaturated polyesters may be affected by the presence of an initiator system containing aminoesters of methacrylic acid. In U.S.S.R. Pat. No. 535,317 to Saikfullin et al, there is disclosed a polyurethane prepolymer composition having improved storage stability, which composition comprises free NCO groups and a catalyst provided by a solid complex salt of a tertiary amine and a carboxy-containing compound selected from polyester acids and acids having dissociation constants in a range of $1 \times 10^{-3}$ to $6 \times 10^{-6}$.

The problem of gel-time drift is particularly acute for polyester resin systems containing a number of chemical-or-physical property-altering additives in combination, such as initiators for initiating curing, reaction-rate promoters for accelerating curing and inhibitors for preventing premature curing of a polyester resin during storage. Also, the presence of fillers, pigments, dyes, thixotropic additives, reinforcement materials, flame retardants, waxes, or lubricants may further contribute to gel-time drift in an unpredictable or uncontrollable manner. There remains, therefore, need for compounds and methods of treatment which will reduce gel-time drift and stabilize curing behavior in polyester resin systems, especially in those polyester resin systems containing several property-altering additives.

SUMMARY OF THE INVENTION

A curable, promoted polyester resin system comprising unsaturated polymerizable material and one or more additive components for altering a physical or chemical property of the resin system is found to have a stabilized gel-time over its useful shelf life by the inclusion of an amine salt reaction product within the resin system. The polyester resin system may thus comprise unsaturated polymerizable material, which includes an unsaturated polyester binder, and one or more physical-or-chemical property-altering components, wherein the amine salt constitutes one of the one or more property-altering components. The amine salt is a salt-like reaction product of an amine and a carboxylic acid-containing moiety. The amine salt may be added to the polyester binder of a resin system between steps of formulation of the resin system or after all formulation steps are completed. The amine salt is added to the polyester resin system in an amount effective to provide a promoted polyester resin system having a gel-time drift which is lower than the gel-time drift of a counterpart promoted polyester resin lacking the amine salt.

An advantage of compositions of the invention is that promoted polyester resin systems are provided which are characterized by a usefully-extended shelf life because of suppression of gel-time drift. Thus a wider variety of resin systems may be employed in molding or coating applications where it is required that gel-times be predictable and vary insignificantly from the initial gel-time which is characteristic of the resin system just after its manufacture. Polyester resin systems of the promoted type having an amine salt in accordance with the invention exhibit after-storage gel-time drifts as low as 7 percent of the gel-time drift of counterpart promoted resin systems lacking the amine salt.

As another aspect of the invention there is provided a polyester resin system which comprises a polyester binder, an amine salt and one or more property-altering additive components but which is formulated without any promoter of the free-amine type. In this aspect of the invention, the amine salt takes the place of a free-amine type promoter. An advantage provided by this resin system is that an amine salt reaction product is generally a slower promoter than its amine precursor. Thus the inclusion of an amine salt, rather than free amine as a promoter, allows the use of a relatively smaller amount of a gelling inhibitor, such as hydroquinone, in a polyester resin system.

DETAILED DESCRIPTION OF THE INVENTION

Figure 1:
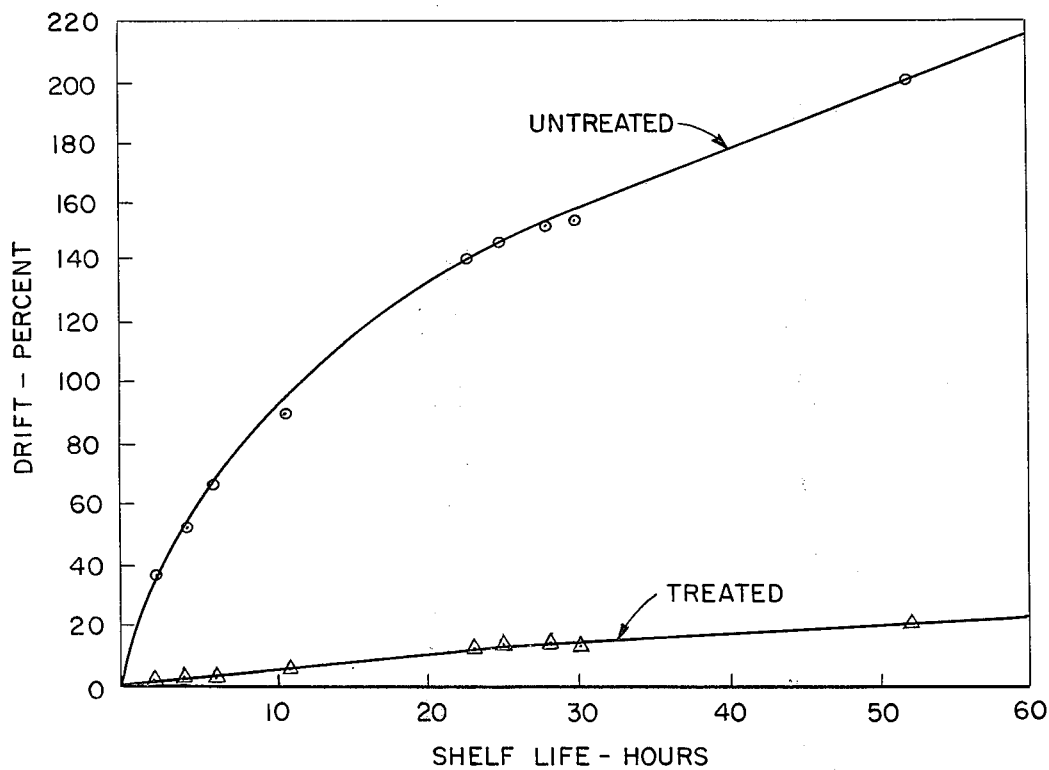
FIG. 1 is a graph showing drift in gel-times during a 52-hour accelerated shelf-life test of a sample of a polyester resin system which includes an amine salt in place of free-amine type promoter in accordance with the invention as compared to a reference sample of the same resin system having free amine promoter, as set forth in Example I.

Practically any polyester resin system may be formulated and treated in accordance with the invention to provide compositions having one or more of the aforementioned advantages. The term "polyester resin system" is intended to describe a mixture of components which provide a curable molding or coating composition containing polymerizable material as provided in part by a polyester binder and one or more of a variety of additive components for modifying physical or chemical properties of the composition. The term "polyester binder" is a shortened version of the expression "unsaturated polyester thermosetting resin binder", and is intended to connote cross-linkable polyesterification material having a substantial amount of ethylenic unsaturation. The polyester binder may self-polymerize or may polymerize by reacting with polymerizable monomeric material containing ethylenic unsaturation. The binder or binder and monomer typically provide a significant portion of the mass of a film-forming coating, or of a cast or molded article, within which the one or more property-altering additive components may be dissolved or dispersed.

The terms "useful shelf life" and "useable storage life" are intended to connote a period of time following manufacture of a polyester resin system during which the polyester resin may perform adequately for its intended purpose whether it be for a coating, casting or molding application. The period of time may be as short as a few days to as long as several years, depending upon the type of polyester resin system and the particular intended use. For purposes of the present invention, suppression of gel-time drift over a period of several months is considered to be a workable period of time advantageous for many types of polyester compositions for a variety of purposes. It is understood that the degree of suppression of gel-time drift varies according to the type of polyester and the conditions of storage. Suppression of gel-time drift of resin systems formulated and treated according to the invention to within plus or minus 25 percent of gel-time drift of untreated counterpart resin systems for a period of two months or more is considered indicative of a high degree of success as to the workability of the invention. Any recognizable suppression of gel-time drift for a significant period of time when using the formulations and treatments of the invention is, however, considered to be of advantage and constitutes evidence of the workability of the invention.

Useful unsaturated polyester resin binders include practically any esterification product of a polybasic organic acid and a polyhydric alcohol, wherein either the acid or the alcohol, or both, provide the ethylenic unsaturation. Typical unsaturated polyesters are those thermosettable resins made from the esterification of a polyhydric alcohol such as a glycol with an ethylenically unsaturated polycarboxylic acid. Examples of useful ethylenically unsaturated polycarboxylic acids include maleic acid, fumaric acid, aconitic acid, itaconic acid, dihydromuconic acid, and halo and alkyl derivatives of such acids. Mixtures of unsaturated polycarboxylic acids may be used or only a single such acid may be employed. The anhydrides of these acids, where the anhydrides exist, are, of course, embraced by the term "acid" since the polyesters obtained therefrom are essentially the same whether the acid or anhydride is used in the reaction.

Polyhydric alcohols useful in preparing ethylenically unsaturated polyesters by reaction with one or more of the aforementioned unsaturated polycarboxylic acids include saturated polyhydric alcohols such as ethylene glycol, 1,3-propanediol, propylene glycol, 2,3-butanediol, 1,4-butanediol, 2-ethylbutane-1,4-diol, 1,5-pentanediol, 1,6-hexanediol, 1,7-heptanediol, 1,8-octanediol, 1,9-nonanediol, 1,10-decanediol, 2,10-decanediol, 1,4-cyclohexanediol, 1,4-dimethylolcyclohexane, 2,2-diethylpropane-1,3-diol, 2,2-dimethylpropane-1,3-diol (neopentyl glycol), 3-methylpentane-1,4-diol, 2,2-diethylbutane-1,3-diol, 4,5-nonanediol, diethylene glycol, triethylene glycol, dipropylene glycol, glycerol, pentaerythritol, erythritol, sorbitol, mannitol, 1,1,1-trimethylolpropane, trimethylolethane, 2,2-dimethyl-3-hydroxypropyl-2,2-dimethyl-3-hydroxypropionate, hydrogenated bisphenol-A and the reaction products of bisphenol-A with ethylene or propylene oxide.

Useful unsaturated polyester resins may be derived from the esterification of a saturated polycarboxylic acid with an unsaturated polyhydric alcohol. Examples of useful saturated polycarboxylic acids include oxalic acid, malonic acid, succinic acid, methylsuccinic acid, 2,2-dimethylsuccinic acid, 2,3-dimethylsuccinic acid, hexylsuccinic acid, glutaric acid, 2-methylglutaric acid, 3-methylglutaric acid, 2,2-dimethylglutaric acid, 3,3-dimethylglutaric acid, 3,3-diethylglutaric acid, adipic acid, pimelic acid, suberic acid, azelaic acid, sebacic acid, phthalic acid, isophthalic acid, terephthalic acid, tetrachlorophthalic acid, tetrabromophthalic acid, tetrahydrophthalic acid, 1,2-hexahydrophthalic acid, 1,3-hexahydrophthalic acid, 1,4-hexahydrophthalic acid, 1,1-cyclobutanedicarboxylic acid and trans-1,4-cyclohexanedicarboxylic acid. As in the case of the ethylenically unsaturated polycarboxylic acids, the anhydrides of the saturated acids, where anhydrides exist, are embraced by the term "acid" since the polyesters obtained therefrom are essentially the same.

Useful unsaturated polyhydric alcohols for reacting with the saturated polycarboxylic acids include ethylenic unsaturation-containing analogues of the aforementioned saturated alcohols, one such analogue, for example, being 2-butene-1,4-diol.

The polyester binder may contain amounts of saturated polyester material which may be prepared by reacting together one or more of the aforementioned saturated polycarboxylic acids with one or more of the aforementioned saturated alcohols. The polyester binder may contain amounts of polyester material derived from the reaction of a mixture of saturated acid and unsaturated acid with a saturated and/or unsaturated alcohol.

The polyester resin binder will generally comprise a significant component of the resin system and thus is typically present in an amount in a range from about 40 to about 90 percent by weight of the resin system. Useful resin systems may be formulated, however, from a wider range of proportions of polyester binder. Thus the amount of polyester binder in the resin system may range from about 10 to about 99 weight percent of the resin system.

Polymerization of the polyester materials during the gelling or curing of the composition can occur by any one of several mechanisms. Where unsaturated polyesters comprise a major portion of the resin system, crosslinking between sites of ethylenic unsaturation of the polyester backbone may provide a cured product. More often the polyester resin system will contain a monomer such as styrene, which is copolymerizable with the polyester material. Other useful monomers include acrylate compounds having one or more sites of acrylic unsaturation.

Examples of suitable acrylic monomers include mono-acrylic compounds such as methyl acrylate, ethyl acrylate, propyl acrylate, butyl acrylate and methyl methacrylate, di-acrylic compounds such as diacrylates and dimethacrylates of ethylene glycol, propylene glycol, diethylene glycol, and bisphenol. A-diglycidyl ether, tri-acrylate compounds such as the triacrylates and the trimethyacrylates of glycerol, 1,1,1-trimethylolpropane and trimethylolethane, and tetra-acrylic compounds such as the tetracrylates and the tetramethacrylates of pentaerythritol and erythritol. Other useful monomer materials include N-vinyl-2-pyrrolidine, divinyl benzene, vinyl toluene, vinyl acetate and diallyl phthalate. The copolymerizable monomer material may be present in the resin system in an amount in a range from about 1 to about 80 percent by weight of the resin system.

The polyester resin system will typically include various additive components for modifying a physical or chemical property of the resin system. Examples of such additive components are inhibitors, promoters, initiators, inert fillers, pigments, dyes, thixotropic additives, reinforcement materials, flame retardants, waxes and lubricants.

An inhibitor is included in a polyester resin system to retard polymerization of the polyester material during storage of the composition or to aid in moderating the gelling or curing process. It is believed that in free-radical catalyzed addition-polymerization reactions, for example, the inhibitor compound absorbs or deactivates free radicals generated spontaneously during storage of the resin system and for a short period after the initiator is added. Examples of useful inhibitors include quaternary ammonium salts as a class, and quinones and dihydric phenols, such as para-benzoquinone, methyl para-benzoquinone, hydroquinone, 3-isopropyl catechol and 4-tertbutyl catechol. Inhibitors may be present in a polyester resin system in an amount in a range from about 0.001 to about 0.1 weight percent of the resin system.

An initiator compound is included in a polyester resin system to catalyze polymerization. A polyester system containing ethylenically unsaturated compounds may polymerize by way of a free-radical initiated, addition-polymerization mechanism. Typical initiator compounds are organic peroxides and hydroperoxides which decompose to provide chain-initiating free radicals. Usually, room temperature initiators are added to the resin system just before intended use of the resin system, such as in a coating, casting or molding operation. Examples of suitable initiators are benzoyl peroxide, methylethylketone peroxide, tert-butyl perbenzoate, cumene hydroperoxide and dicumyl peroxide. Other initiator compounds may include azo-type compounds, such as azo-bis-isobutyronitrile. One or more initiators may be present in a polyester resin system in an amount in a range from about 0.1 to about 3 weight percent of the resin system.

A promoter, or co-promoter, or accelerator may be included in a polyester resin system to aid in catalyzing the polymerization process. For example, in many molding or coating operations it may be desirable to initiate polymerization without the application of heat to the composition. A promoter compound typically aids in lowering the threshold temperature at which free radicals may be made available for initiating addition polymerization. Examples of useful promoters are metal-containing compounds such as cobalt octoate, or organic compounds containing vanadium, manganese, iron or nickel, tertiary amines such as diethylaniline, or a combination of both a metal-containing compound and a tertiary amine. Usually, a promoter compound or a combination of promoter compounds, as a promoter and co-promoter combination, may be present in a polyester resin system in an amount in a range from about 0.01 to about 3 weight percent of the resin system.

Extender pigments, coloring pigments or dyes may also be included in a polyester resin system. Examples of extender pigments are silica, calcium carbonate, barium sulfate, talc, aluminum silicates, sodium aluminum silicates and potassium aluminum silicates. Examples of hiding pigments are titanium dioxide, antimony oxide, zirconium oxide, zinc sulfide and lithopone. Examples of coloring pigments are iron oxides, cadmium sulfide, carbon black, phthalocyanine blue, phthalocyanine green, indanthrone blue, ultramarine blue, chromium oxide, burnt umber, benzidine yellow, toluidine red and aluminum powder. When used, one or more of these additives may be present in the resin system in an amount in a range from about 1 to about 80 weight percent of the resin system.

One or more thixotropic materials may be added to provide thixotropic character to the resin system. Examples of such materials are fumed silica, castor oil based compositions (e.g., Thixatrol ST, Baker Castor Oil Company), Cab-O-Sil, carboxymethylcellulose, modified clays, 12-hydroxystearic acid, tetrabutyl orthotitanate and microcrystalline cellulose. When used, these materials are usually present in an amount in the range of from about 0.5 percent to about 15 percent by weight of polyester present.

A polyester resin system may be formulated by mixing together amounts of polyester binder and polymerizable monomer in proportion to give a viscosity and other physical properties suitable for a particular molding or coating application. The additive components may then be introduced into the polyester-monomer mixture simultaneously or serially with suitable agitation to dissolve or disperse the additive components throughout the mixture.

The terms "salt-like reaction product", "amine salt reaction product" and "amine salt" are intended to be used interchangeably to describe the same types of compounds for use in the invention. These terms are intended to connote reaction products of an amine and a carboxylic acid-containing moiety which are salt-like in nature. For example, the salt-like reaction product typically has ionic character. Moreover, the amine salt reaction product may be formed by replacing the hydrogen ion of the carboxylic acid moiety with a cation provided by the amine; that is, the amine cation may be formed by transfer of hydrogen ion from the carboxylic acid to the nitrogen atom. Thirdly, formation of the amine salt reaction products useful in the invention are not accompanied by the generation of free hydrogen or the formation of water, as is typical in many salt-forming reactions between acids and bases.

For example, a typically useful and preferred amine salt reaction product for use in the invention is that formed by the reaction of diethylaniline and phthalic acid.

Reaction products of an amine and a carboxylic acid not typified by the aforementioned definition of "amine salt" are not intended to be included within the scope of the invention. Amides, for example, are outside the scope of the definition of salt-like reaction products useful in the invention. Also, it should be mentioned that quaternary ammonium salts as a class are not within the scope of the definition of amine salt as used in the invention.

An amine salt useful in the invention may be prepared by reacting a suitable amine with a suitable carboxylic acid-containing moiety. For example, a mixture of equimolar amounts of diethylaniline and phthalic acid may be prepared and thereafter heated with stirring for a sufficient time to provide a suitable reaction product. The mixture is then allowed to cool to room temperature with stirring. Alternatively, the salt-like reaction product may be derived from the reaction of an anhydride of a suitable carboxylic acid-containing moiety, water and a suitable amine. In the latter preparation, the anhydride, the amine and water are mixed together and heated with stirring under an inert atmosphere for a sufficient time and thereafter cooled to room temperature. A suitable amine salt may also be prepared by mixing diethylaniline, phthalic acid and water at room temperature for several hours.

Suitable amines which may be utilized to prepare the amine salt include amines capable of forming a salt-like reaction product useful in the invention with a suitable carboxylic acid-containing moiety. Tertiary aromatic amines capable of forming a salt-like reaction product with a suitable acid are preferred. Examples of tertiary aromatic amines are dialkylanilines such as dimethylaniline, diethylaniline and dipropylaniline; especially preferred for use in the invention is diethylaniline.

Suitable carboxylic acid-containing moieties which may be utilized include carboxylic acids capable of forming a salt-like reaction product with a suitable amine. Dicarboxylic acids, especially aromatic dicarboxylic acids capable of forming a salt-like reaction product with a suitable amine, are preferred. Examples of dicarboxylic acids are oxalic acid, malonic acid, succinic acid, glutaric acid, adipic acid, pinelic acid, suberic acid, azelaic acid, sebacic acid, maleic acid and fumaric acid. Examples of aromatic dicarboxylic acids are phthalic acid, isophthalic acid and terephthalic acid; especially preferred for use in the invention is phthalic acid. The anhydrides of these acids, where the anhydrides exist, are deemed equivalent to the acids for purposes of the instant invention, and will, of course, require the presence of water to provide the acid analogue for reaction with the amine. Examples of such anhydrides are succinic anhydride, maleic anhydride and phthalic anhydride.

An especially preferred amine salt is provided by the salt-like reaction product of diethylaniline and phthalic acid.

The salt-like reaction product is added to a polyester resin system in an amount which is generally equivalent to the free-amine type promoter which it replaces such that gel-time drift is reduced during the useable shelf-life of the polyester resin system. The amount of salt-like reaction product added to the resin system in place of free-amine type promoter may vary according to the kinds and amounts of polyester, monomer and additive components in the resin system. Generally, an amount of salt-like reaction product may be added to the resin system in a range from about 0.02 percent to about 7 percent by weight of the resin system. Amounts of amine salt in a range from about 0.05 to about 2 weight percent of the resin system are preferred. Amounts of amine salt in a range from about 0.05 to about 0.5 weight percent of the resin system are especially preferred.

The salt-like reaction product may be added to the resin system either before, along with, or after introduction of the other, optionally-included, property-altering components. The salt-like reaction product can be dissolved in a solvent, such as diethylene glycol, to aid in dispersion of the amine salt throughout the resin system. Any conventional mixing apparatus known in the art may be used to mix the polyester resin, amine salt and additive components.

It is well known that polyester resin systems containing free-amine type promoters, such as dimethylaniline, diethylaniline and di(hydroxyethyl)aniline, are subject to gel-time drift. While the exclusion of a free-amine type promoter from a polyester resin system may reduce gel-time drift, the absence of the promoter can be disadvantageous inasmuch as longer gel-times may result or higher energies in the form of hat, for example, may be required to accelerate curing. Thus as another aspect of the invention, there is provided a method of promoting a polyester resin system without employing free-amine type promoter, which method comprises adding to unsaturated polymerizable material an amount of salt-like reaction product of an amine and a carboxylic acid-containing moiety.

Compositions provided by the method are exemplified by a relatively low-energy curing polyester resin system having a gel-time drift over its useful life in a range not greater than plus or minus 25 percent from the initial gel-time of the resin system and which has substantially no free amine-type promoter added during formulation of the resin system and which resin system comprises unsaturated polymerizable material and a salt-like reaction product of an amine and a carboxylic acid-containing moiety, the salt-like reaction product being present in an amount effective to provide a resin system wherein gel-time drift is suppressed during the useable shelf-life of the resin system as compared to a counterpart free amine promoted resin system lacking the salt-like reaction product.

Replacement of free amine type promoters with an amine salt reaction product is also of advantage in polyester resin systems comprising polymerizable material and a plurality of property-altering additive components. Thus another composition exemplifying the invention is a relatively low-energy curing polyester resin system having a gel-time drift over its useful life in a range not greater than plus or minus 25 percent from its initial gel-time, which resin system has substantially no free amine promoter added during formulation and which comprises:

a. an unsaturated polyester binder in an amount in a range from about 20 to about 99 weight percent of the resin system;

b. a copolymerizable monomer in an amount in a range from about 1 to about 80 weight percent of the resin system;

c. an inhibitor in an amount in a range from about 0.001 to about 0.1 weight percent of the resin system; and d. an amine salt in an amount in a range from about 0.1 to about 2 weight percent of the resin system.

The following examples set forth specific embodiments of the invention. The invention is not to be construed, however, as being limited to these embodiments for there are, of course, numerous possible variations and modifications. All parts and percentages of the examples as well as throughout the specification are by weight unless otherwise indicated.

These examples demonstrate methods of treatment of a polyester resin system with a salt-like reaction product of an amine and a carboxylic acid-containing moiety to obtain gel-time stabilized compositions in accordance with the invention. In order to test the efficacy of the treatment methods, gel-times for treated and untreated samples of a polyester resin system are measured according to the following general procedure:

A 50 gram sample of the resin system material and 0.5 percent by weight of methylethylketone peroxide catalyst (60 percent in dibutylphthalate solution) are placed in a disposable reaction vessel maintained at 25° C. and mixed with a stirring rod for one minute. After a five-minute period, the sample is stirred for 15 seconds and then allowed to stand undisturbed in the reaction vessel until the gel snap point is reached. The gel snap point is that point in the curing time at which the resin becomes rubbery and snaps from the stirring rod when the rod is lifted out of the resin mass.

EXAMPLE I

A polyester resin system is formulated by firstly mixing and reacting together the following components in the designated amounts to form a polyester resin material:

| Component | Moles |
|---|---|
| phthalic anhydride | 2.0 |
| maleic anhydride | 1.0 |
| propylene glycol | 3.0+ |

The polyester binder is diluted with styrene to provide a liquid solution having a viscosity in a range from about 5.5 to 7 poises at 25° C. Then to the polyester binder solution there is added a mixture of property-altering additive components of specific types and amounts to provide a doubly-promoted formulation containing cobalt and diethylaniline promoters as found in a commercially available proprietary resin system sold under the trade designation K-1060-5 by Koppers Company, Inc. This polyester resin system constitutes the reference untreated sample.

A reaction vessel equipped with stirring means, heating means, and a thermometer, is charged with 73 parts phthalic acid and 59.6 parts redistilled diethylaniline. The mixture is heated with stirring to a temperature of about 85° C. in less than 10 minutes. The application of heating is discontinued and the temperature is observed to rise to about 95° C., at which time a clear solution is noted. The reaction mixture is allowed to cool with stirring. Thereafter, 46.2 parts diethylene glycol is added to the cooled salt-like reaction product.

A polyester resin system is formulated as set forth above, except that in place of the diethylaniline there is added the previously prepared glycol-diluted salt-like reaction product to provide a polyester resin system test sample. The test sample contains the glycol-diluted amine salt in an amount of about 0.3 weight percent based on the weight of the polyester resin system. Accelerated shelf life conditions are imposed by storing the reference and test samples at 55° C. Gel-times for the test sample and an untreated reference sample are determined according to the described gel snap point method at 10 intervals over a period of 52 hours. Data for 10 measurements are listed in Table I. In FIG. 1, there is depicted a comparative plot of percent changes or drift in gel-time over the 52-hour test period for the reference and test samples. The comparative test demonstrates that the polyester resin system formulated and treated according to the method of the invention has a gel-time drift (ca. 21.6 percent) which is suppressed by a factor of about 10 as compared to the gel-time drift (ca. 200 percent) of the reference sample. Gel-time drift for the treated sample is thus only about 11 percent of the untreated sample.

EXAMPLE II

Figure 2:
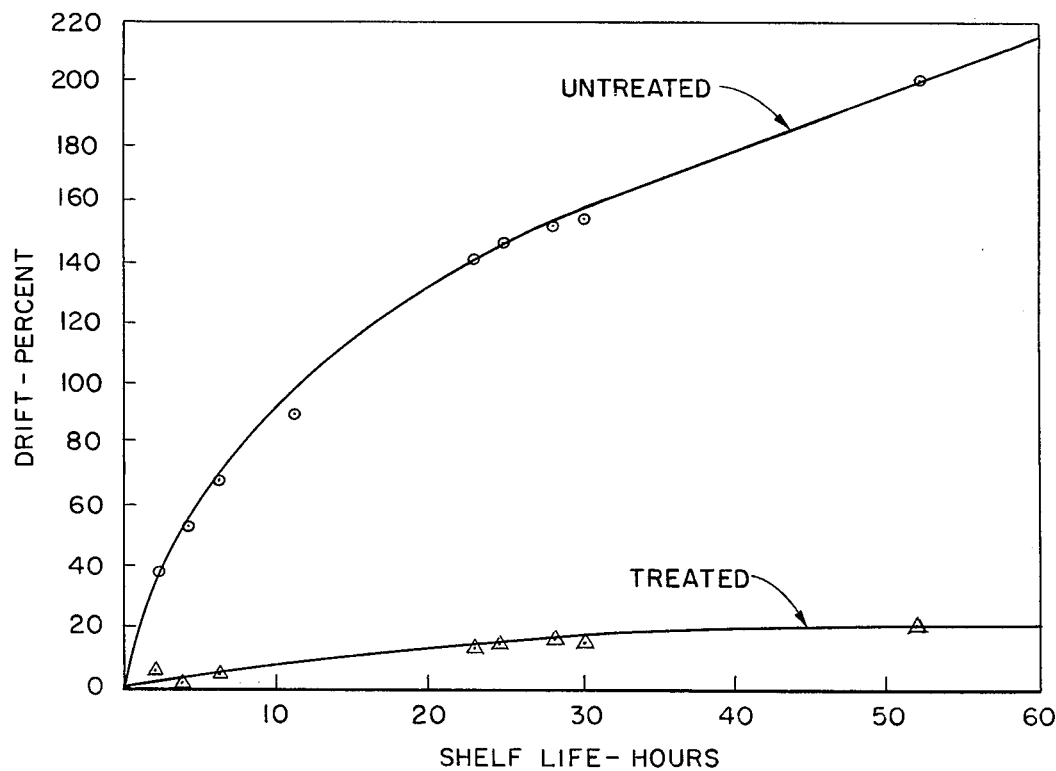
FIG. 2 is a graph showing drift in gel-times during a 52 hour accelerated shelf-life test of a sample of a polyester resin system which includes an amine salt in place of free-amine type promoter in accordance with the invention as compared to a reference sample of the same resin system having free amine promoter, as set forth in Example II.

A reaction vessel equipped with stirring means, heating means, a thermometer and a condenser is charged with 148 parts phthalic anhydride, 149 parts diethylaniline and 18 parts water. The mixture is heated with stirring under a nitrogen atmosphere to a temperature of 85°–95° C., at which time a clear solution is observed, the temperature thereafter rising to 135°–140° C. because of the exothermic reaction. The reaction product after being cooled to room temperature is observed to be a viscous, light colored liquid. To 7.5 parts of the liquid, salt-like reaction product there is added 3.2 parts diethylene glycol. A doubly-promoted untreated reference sample containing cobalt and diethylaniline promoters is formulated according to Example I. A test sample is formulated like the reference sample except that the above-prepared glycol-diluted amine salt is substituted for the diethylaniline promoter in an amount of about 0.3 weight percent based on the weight of the polyester resin system. Accelerated shelf-life conditions are established by storing the reference and test samples at 55° C. Gel-times for the test sample and untreated reference sample are determined as in Example I. Comparative data for gel snap point measurements are set forth in Table I and in FIG. 2. Again, the polyester resin system formulated and treated according to the invention has a gel-time drift (ca. 22 percent) which is suppressed by a factor of 10 as compared to the gel-time drift (ca. 200 percent) of the untreated reference sample.

TABLE I

Gel-Time Drift for Treated and Untreated Samples of Polyester Resin System

| Shelf Life at 55° C. (hours) | Untreated Reference Sample | | Treated Test Sample (Ex. I) | | Treated Test Sample (Ex. II) | |
|---|---|---|---|---|---|---|
| | Gel time (min) | Change from initial gel time (%) | Gel time (min) | Change from initial gel time (%) | Gel time (min) | Change from initial gel time (%) |
| 0 | 27.2 | — | 25.0 | — | 24.7 | — |
| 2 | 37.5 | 37.8 | 25.3 | 1.2 | 26.2 | 6.1 |
| 4 | 41.4 | 52.2 | 25.8 | 3.2 | 25.1 | 1.6 |
| 6 | 45.6 | 67.6 | 25.5 | 2.0 | 25.6 | 3.6 |
| 11 | 51.8 | 90.4 | 26.5 | 6.0 | 26.2 | 6.1 |
| 23 | 65.7 | 141.5 | 27.9 | 11.6 | 27.7 | 12.1 |
| 25 | 66.3 | 143.7 | 28.4 | 13.6 | 27.9 | 12.9 |
| 28 | 68.3 | 151.1 | 28.4 | 13.6 | 28.1 | 13.7 |
| 30 | 69.9 | 157.0 | 27.8 | 11.2 | 28.0 | 13.3 |
| 52 | 81.7 | 200.4 | 30.4 | 21.6 | 30.2 | 22.2 |

EXAMPLE III

Six lots of a doubly-promoted polyester resin system containing cobalt and diethylaniline promoters are independently formulated as generally described in Example I. Six lots of polyester resin system test samples are formulated like the reference samples except that amine salt as prepared in Example I or II is substituted for the diethylaniline promoter in an amount to provide test samples having 0.3 weight percent glycol-diluted amine salt based on the weight of the polyester resin system. Over a period of 61 days and at approximately 6 to 17 day intervals, gel-times for each of the six treated samples and for untreated polyester resin system reference samples are measured by subjecting portions of the samples to the aforementioned gel snap point determination method.

Figure 3:
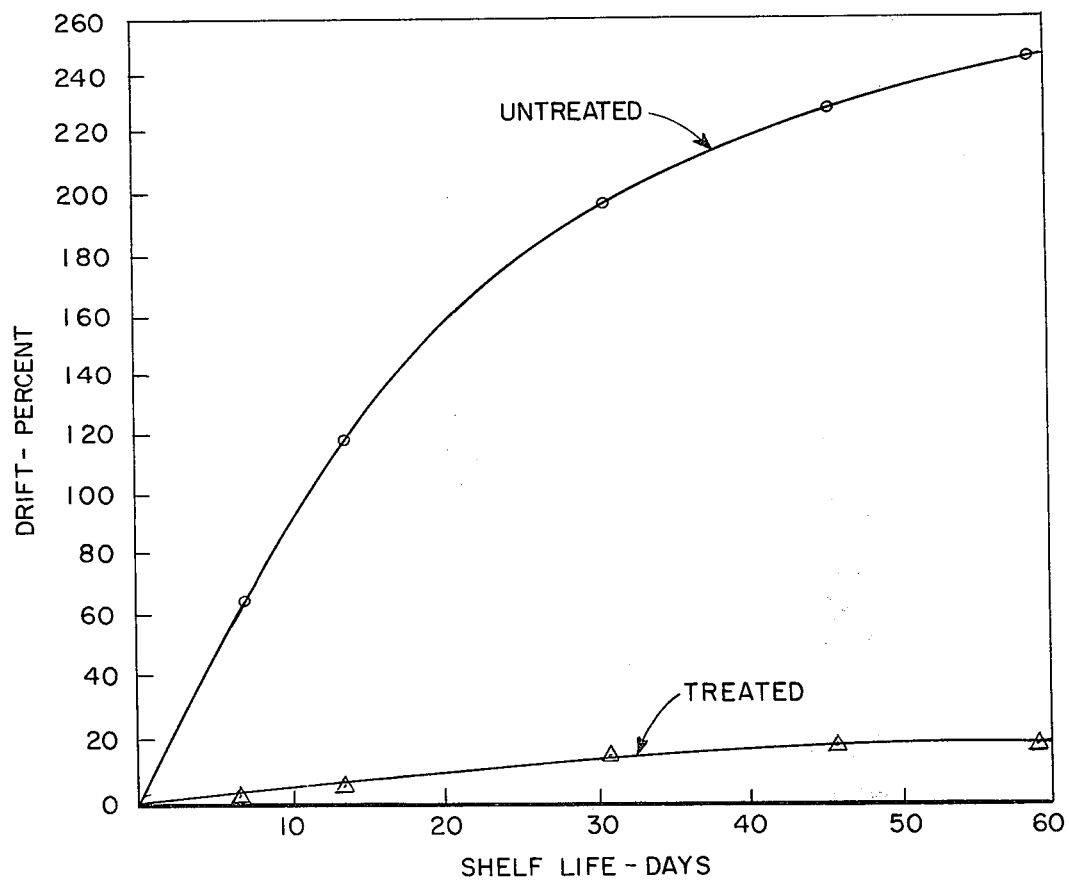
FIG. 3 is a graph showing drift in gel-times over a two-month storage period of samples of six lots of a polyester resin system which includes an amine salt in place of free-amine type promoter in accordance with the invention as compared to samples of the same lots of the polyester resin system having free amine promoter, as set forth in Example III.

Gel-time data are listed in Table II. In FIG. 3, there is plotted the average percent change in gel-time during the 61-day test period of the treated test samples as compared to the untreated reference samples. The comparative data show after a 61-day storage period that a polyester resin system formulated and treated according to the invention has a gel-time drift (ca. 18 percent) that is suppressed by a factor of about 14 with respect to the gel-time drift (ca. 245 precent) of the untreated polyester resin system. Gel-time drift of the treated samples are, on the average, only about 7 percent of the gel-time drift of the untreated samples.

TABLE II

Gel-Time Drift for Six Lots of Treated and Untreated Samples of Polyester Resin System (Example III)

| | Untreated Reference Samples | | | Treated Test Samples | | |
|---|---|---|---|---|---|---|
| Shelf Life (days) | Lot Gel time (min) | Average Gel time (min) | Average Change From Initial Gel time (%) | Lot Gel time (min) | Average Gel time (min) | Average Change From Initial Gel time (%) |
| 0,1 | 14.6 | | | 23.9 | | |
| 0,1 | 13.3 | | | 27.6 | | |
| 1 | 15.9 | 19.2 | — | 19.7 | 24.7 | — |
| 1 | 20.7 | | | 25.9 | | |
| 0 | 28.4 | | | 26.3 | | |
| 0 | 22.2 | | | 24.7 | | |
| 8 | 26.8 | | | 23.8 | | |
| 7 | 22.2 | | | 29.1 | | |
| 7 | 30.7 | 31.9 | 66.1 | 27.3 | 25.2 | 2.0 |
| 7 | 34.9 | | | 27.3 | | |
| 6 | 43.7 | | | 28.0 | | |
| 6,7 | 33.3 | | | 22.9 | | |
| 15 | 32.3 | | | 23.5 | | |
| 14 | 30.8 | | | 28.4 | | |
| 14 | 38.4 | 42.2 | 119.8 | 22.6 | 26.0 | 5.3 |
| 14 | 48.0 | | | 28.2 | | |
| 12 | 58.0 | | | 28.9 | | |
| 13,14 | 45.7 | | | 24.4 | | |
| 33 | 42.2 | | | 24.0 | | |
| 30 | 39.7 | | | 31.2 | | |
| 33 | 48.9 | 56.7 | 195.3 | 24.2 | 27.9 | 12.9 |
| 32 | 71.2 | | | 30.8 | | |
| 29 | 81.1 | | | 31.8 | | |
| 28,29 | 56.8 | | | 25.3 | | |
| 47 | 45.2 | | | 25.2 | | |
| 48 | 53.2 | | | 34.1 | | |
| 44 | 53.0 | 63.1 | 228.6 | 24.3 | 29.1 | 17.8 |
| 46 | 83.5 | | | 33.2 | | |
| 43 | 79.8 | | | 32.8 | | |
| 46,47 | 63.7 | | | 25.1 | | |
| 60 | 47.2 | | | 25.8 | | |
| 59 | 56.4 | | | 36.1 | | |
| 58 | 52.9 | 66.2 | 244.8 | 25.0 | 29.2 | 18.2 |
| 61 | 83.5 | | | 31.5 | | |
| 57 | 88.2 | | | 31.1 | | |
| 57 | 68.8 | | | 25.5 | | |

Although specific examples of the instant invention have been set forth hereinabove, it is not intended that the invention be limited solely thereto, but is to include all the variations and modifications falling within the scope of the appended claims.

What is claimed is:

1. A non-free-amine type promoter system for promoting the polymerization of a free-radical catalyzed polyester composition, the promoter system comprising a first promoter and a second promoter, said first promoter provided by a salt-like reaction product of an amine and an aromatic dicarboxylic acid, said promoter system further characterized in providing a promoted curable polyester composition having a gel-time drift which is suppressed during the useable shelf-life of the polyester composition as compared to a counterpart free-amine promoted polyester composition lacking said salt-like reaction product.

2. The promoter system of claim 1 wherein said amine is a tertiary aromatic amine.

3. The promoter system of claim 2 wherein said tertiary aromatic amine is diethylaniline.

4. The promoter system of claim 1 wherein said aromatic dicarboxylic acid is phthalic acid.

5. The promoter system of claim 1 wherein said second promoter is provided by a metal-containing organic compound.

6. The promoter system of claim 5 wherein said metal-containing organic compound is a cobalt-containing organic compound.